United States Patent [19]

Edgar

[11] 4,360,885
[45] Nov. 23, 1982

[54] MICRO-OPTICAL TOMOGRAPHY

[76] Inventor: Albert D. Edgar, 3912 Eton La., Austin, Tex. 78759

[21] Appl. No.: 109,092

[22] Filed: Jan. 2, 1980

[51] Int. Cl.³ ............................................. G02B 27/00
[52] U.S. Cl. .................................. 364/525; 350/3.73; 350/46; 364/515
[58] Field of Search ............... 364/525, 414, 556, 515; 356/123, 125; 250/234; 353/101; 350/9, 41, 46, 373, 162 SF

[56] References Cited

U.S. PATENT DOCUMENTS

| | | | |
|---|---|---|---|
| 3,932,733 | 1/1976 | Olsen et al. | 364/525 X |
| 4,012,634 | 3/1977 | Bouton et al. | 364/525 X |
| 4,023,037 | 5/1977 | Weiss et al. | 350/3.73 X |
| 4,118,099 | 10/1978 | Weiss et al. | 350/3.73 |
| 4,146,926 | 3/1979 | Clerget et al. | 364/525 X |
| 4,164,788 | 8/1979 | Jain | 364/525 X |
| 4,202,037 | 5/1980 | Glaser | 364/525 X |
| 4,282,511 | 8/1980 | Southgate et al. | 350/162 SF X |
| 4,288,852 | 9/1981 | Holland | 364/515 X |

OTHER PUBLICATIONS

A Computerized Microscope Focusing Technique, Mason & Green, Microscopica ACTA, vol. 78, No. 5, Nov. 1976, pp. 439-448.
Hybrid Optical and Electronic Image Processing for Strain Measurements by Speckle Photography, Ineichen, et al.; Applied Optics, Jul. 1, 1980, vol. 19, No. 13, pp. 2191-2195.
Computer Controlled Automatic Digital Microdensitometer; Brailko, et al., The Optical Society of Americal, Sov. J. Opt. Technol., vol. 43, No. 4, Apr. 1976; pp. 233-235.

Primary Examiner—Edward J. Wise
Attorney, Agent, or Firm—Robert M. Hessin

[57] ABSTRACT

Micro-optical tomography is a technique for more fully utilizing the information conveyed by light in microscopy. This is accomplished with an objective lens imaging on a two-dimensional sensor, by scanning a parameter affecting the phase and amplitude of the reconstruction of the wavefront by the lens, such as focus, to form, with the scanned parameter as an axis, a higher dimensional image matrix, and operating on that image matrix with computer-aided image processing to extract information not visible in the fixed optical reconstruction of conventional microscopy. The reconstruction can form an optical dissection of a specimen, or an image of a dimensional object with all planes in focus simultaneously.

5 Claims, 10 Drawing Figures

MICRO-OPTICAL TOMOGRAPHY

BACKGROUND OF THE INVENTION

1. Field of the Invention

This invention relates to microscopy, optical imaging, adaptive optics, computer image processing, and computer-aided tomography.

2. Description of the Prior Art

Light waves interact with a microscopic specimen to form a transform of optically accessible elements. This transform simultaneously bears spatial information from all visible areas of the specimen with an elemental, or distinguishable pixel, size to ¼ of the wavelength of light in the surrounding medium. A conventional microscope objective phasally retransforms the wavefront to cause convergence onto a two-dimensional sensor, such as a film, vidicon, the human retina, or in a reciprocal relationship a flying-spot scanner CRT, forming a representation of the original specimen with elemental clarity proportional to the cosine of the half-angle with which the objective encompasses the element, and depth clarity inversely related to that angle. Large numerical aperture (N.A.), optically perfect, objectives ultimately approach the ¼ wave limit mentioned above at complete cutoff, or 0% modulation transfer, with a Rayleigh limit 1.22 times this size, and with however still less than 50% transfer at twice the size, or equivalently half the cutoff spatial frequency, giving a "soft focus" effect. This highest resolution is obtained at the expense of the narrowest depth of field, less than half the wavelength of light axial to the lens, precluding the viewing of dimensional relationships. To regain some depth of focus, a smaller N.A. objective is used, with proportionally less resolution. Yet the need for depth clarity is such that these "low power" objectives usually are considered the most useful.

By utilizing the extremely short De Broglie waves of moderate speed electrons, the scanning electron microscope permits a wide depth of focus comparable in appearance to macro-photography, and therefore is often used even for magnifications below 3,000× of dimensional specimens which light as a transform would be capable of imaging if retransformation technology were available. A disadvantage of electron microscopy is the requirement of a vacuum, and corollary dehydration and cellular breakdown caused by boiling or sublimation, preventing almost all life forms from being viewed in vivo, and preventing many structurally delicate life forms from being directly viewed at all. Of course an electron microscope can not image natural color.

Depth of focus has been extended in the prior art by "integrated focusing" in which the focus is changed, with a special objective that prevents magnification variance, during an exposure of a single image. The result is a very soft image with, however, some detail from several planes. A modification of this technique projects the illuminating light in a plane which is moved with the plane of focusing; however, this is primarily limited to opaque, convex objects with no concave pockets, and also to low magnifications and viewing angles, as light can not be confined to a plane one wavelength thick over a width of more than one wavelength.

Classical x-ray tomography uses a moving source and film to introduce a limited depth of field to a normally "infinite" depth of field x-ray system, the reverse of the goals of micro-optical tomography. Computer-aided tomography (CAT) mathematically dissects a subject from a set of one-dimensional scans at varying angles, a 2-D to 2-D transformation. Because opaque reflection imaging and the limiting optical features of diffraction, focus, and depth of field do not exist in macro x-ray work, CAT and micro-optical tomography are substantially different technologies.

SUMMARY OF THE INVENTION

It is a paramount object of this invention to provide a means for imaging dimensional specimens using light illumination, with a depth of focus range times magnification product that in the prior art would have required an electron beam illumination.

A corollary object is to provide a means of viewing biological specimens in an aqueous environment at a depth times magnification product much greater than possible with current art by any means.

It is a further object of this invention to provide a means of optically dissecting visually accessible regions of a specimen.

It is also an object of this invention to provide in optical stereo microscopy a planar resolution and depth clarity, each of which is independently greater than is possible with current art.

It is a final object of this invention to provide a selection in depth optical microscopy between boundaries appearing transparent or opaque to regions below.

The above objects are accomplished in accordance with the invention by providing optical means for projecting an image of a specimen on a two-dimensional sensor forming an image matrix, means for scanning one or more parameters of the optical imaging system affecting wave phase and magnitude, such as focus, while operating the sensor, to form layers of a higher dimensional matrix, and means of operating on this matrix with mathematical functions to extract information not apparent in a single layer of the higher dimensional matrix.

DETAILED DESCRIPTION OF THE INVENTION

Figure 1:
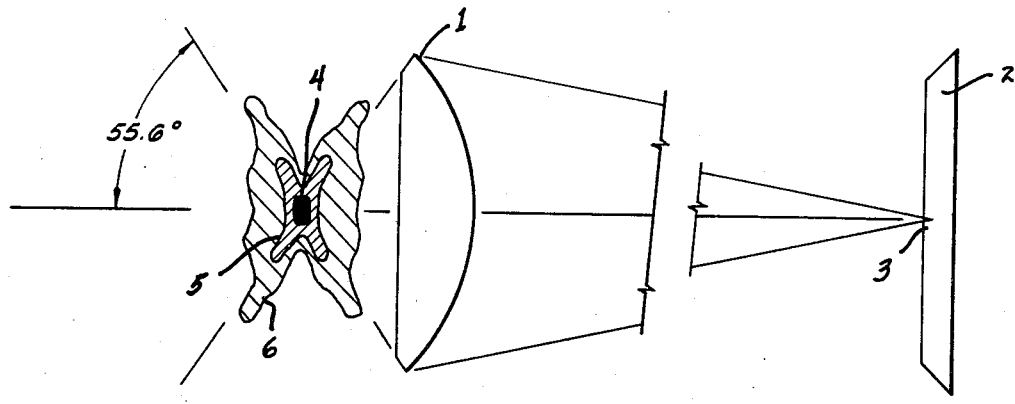
FIG. 1 illustrates the blurring of an optically perfect lens.

Referring now to FIG. 1, the wavefront at the microscope objective lens 1 is a transform of the specimen, containing detail approaching half the wavelength of light in spatial wavelength and a quarter of the wavelength in pixel size. The lens operates on this transform by shifting the phase of the wave front by an amount approximately proportional to the square of the distance from the lens axis to the point on the lens at which the wave interacts. This phase change causes the wave front to reconverge behind the lens, forming a dimensional image. A two-dimensional sensor 2, such as a film or human retina, is placed through this image to view one plane of the specimen. This optical transform wastes most of the information available in the wavefront, and even in the "plane of focus" attentuates the fine detail carried by light from the specimen. A point 3 on the sensor actually "sees" a blurred region on the subject, illustrated by contour lines 4 to 6, shown greatly magnified for purposes of illustration. The contours depict:

The small core of best focus 4 confining the highest spatial frequencies,

Bright rings circling the disk 5 of a defocused point, transforming a slightly defocused point of light into an apparent ring with a dark center, and Cone shaped regions of sensitivity 6 distant from the plane of focus, subtending typically 55.6° for a 1.25 N.A. lens in oil.

In the plane of best focus with monochromatic light this blurring function gives a modulation transfer function (M.T.F.) as a function of spatial frequency S, normalized so S=1=cutoff, of:

$$M.T.F. = 1 - \frac{2}{\pi} \cdot \left[ s \cdot \sqrt{1 - s^2} + \text{SIN}^{-1}(S) \right] . \quad (1)$$

Convolving with the inverse transform recreates an exact image of a specimen that is confined to the plane of best focus, subject to the constraint that only spatial frequencies lower than cutoff can be reproduced, as is well known. Now if images from many incremental focus displacements are arranged in a three-dimensional image matrix, the image may be convolved with the inverse transform of the three dimensional blurring function, subject again to certain constraints, to recreate an exact image of optically accessible planes of a dimensional specimen, layer by layer. The constraints are, however, more complex than in the two-dimensional case, and a simple linear reconstruction of focus-varied data alone is insufficient for a "best" reconstruction.

An exact reconstruction of the image is not possible in the dimension perpendicular to the lens with dynamic-focus-generated data only, which resembles classical tomography. For example, consider an infinite sheet of transparent colored material near the image plane. An observer can not detect its position, as its effect is independent of the focus setting of the objective. However, boundaries may be reconstructed in all axes with dynamic-focus data as, for example, with a small sheet of transparent colored material, all boundaries of which can be precisely imaged and therefore located in all axes to within diffraction limits. Most image characteristics in the dimension perpendicular to the lens can be reconstructed from the dynamic focus data using boundary conditions, provided the boundaries are visible within the field of view. Additional image characteristics perpendicular to the lens are reconstructible from an angular scan, which may be performed on the principle of single objective stereo microscopy by moving an aperture without moving the lens elements or specimen, which provides data resembling in some ways that of computer-aided x-ray tomography. The utility of this data is visualized by noting that the infinite colored sheets would appear denser when viewed from an angle closer to the plane of the sheet, and thus its incremental angle could be determined and tracked.

Depth of field extension, as opposed to image dissection, is easily performed. The "infinite colored sheet" and related problems discussed for optical dissection do not need to be resolved for depth of field extension. A basic procedure uses a pattern recognition program to detect correct focus, much as does a human observer. Such an algorithm could note a peaking of the ratio of high to low spatial frequency components as a function of focus. A suitable program for general computer application is disclosed in "Image Contrast Theory of Electronic Focus", Journal of the Optical Society, Am., Vol. 68, No. 10, October 1978, pages 1309-1318. The detected area of focus can then be added to the image being formed.

Several complications arise. An effect well known to microscopists is the ability to view "through" small opaque objects. Actually the large N.A. of the microscope objectives allow the microscopist to view around the object on all sides. This transparency, or ghosting, is normally not desirable when all objects can be focussed simultaneously. It can be obviated by reconstructing from the back of the specimen to the front, allowing each detected area of focus to overwrite a posterior image. As a further complication, a bright defocused object will spill visually sharp rings considerably beyond its boundaries which could interfere with detection of focus. However, the rings have strong distinguishing features that can be used to detect their presence instead of a true image. First, their visual position changes as a function of focus, while that of a focused image does not. Second, although they may appear visually "sharp", i.e. "contrasty" at middle spatial frequencies, they lack the highest spatial frequencies. The difference between "sharp" and "high resolution" is well known among photographers, and is easily detected mathematically. The difference can be enhanced with a "fuzzy edge" aperture. Third, and most important, an object behind another can not cast these rings additively over an object in front when the plane of focus intersects the front object. The converse effect of an object in back can then be cancelled as each deeper plane is located by subtracting from that found image plane the higher image planes blurred in proportion to the relative depth between planes. Boundary diffraction effects are easily compensated at this stage if diffraction effects are being compensated.

Figure 2A:
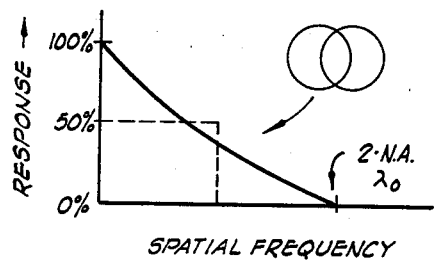
FIGS. 2A, 2B, 2C and 2D represent selected light modulation transfer functions.

Next let us consider what effective image clarity is possible from micro-optical tomography. Consider a typical situation in which an observation is normally made with a 0.65 numerical aperture objective. The spatial response of the lens transform at optimum focus is plotted in FIG. 2A which, for a full field illumination, may be derived from the overlap of the aperture disk at various displacements, corresponding to the ability of the lens to encompass both the direct and diffracted rays of a given spatial frequency. Note that a grating with spatial wavelength half that of light would diffract light 180°, resulting in the fringe limit for a lens covering a 180° cone of light, and also the fringe limit of light as a transform, because nothing can be redirected by more than 180°, modulo 360°. The modulation transfer function of a small N.A., focused optically perfect lens in monochromatic, omnidirectional light, was calculated from disk overlap. Let s=spatial frequency normalized so $s=1=\lambda_c$. $0 \leq s \leq 1$. Then the modulation transfer function is as set forth in Equation (1).

Assume the microscopist chose the common 0.65 N.A. lens for maximum detail, indicating that a smaller aperture would reduce resolution by diffraction, and a larger one by depth of focus considerations. Thus a typical point on the object is blurred by an optimum balance of these two factors, represented in FIG. 2B. The M.T.F. near cutoff is higher than would be expected from convolving the diffraction and focus aberrations. Near cutoff, only the edges of the objective are able to encompass both the direct and diffracted rays. By forming the image with only the periphery of the lens, the defocus effects, arising from phase differences at different radial distances from the lens axis, are lessened.

Figure 2C:
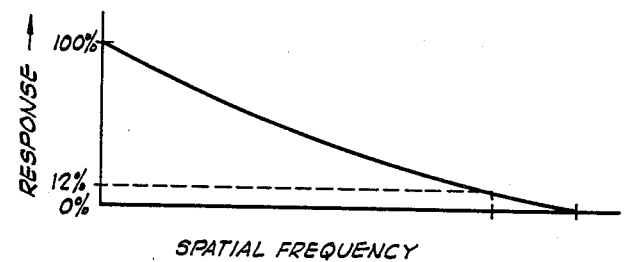
Figure 2B:
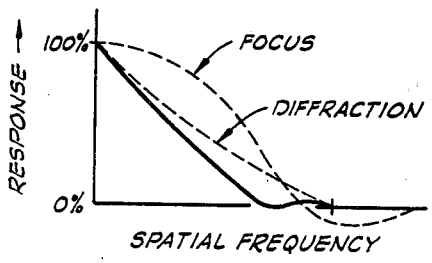

When using micro-optical tomography there will be no depth of focus blurring effects, allowing direct use of a 1.25 N.A. (or higher) immersion objective, with response as shown in FIG. 2C.

Figure 2D:
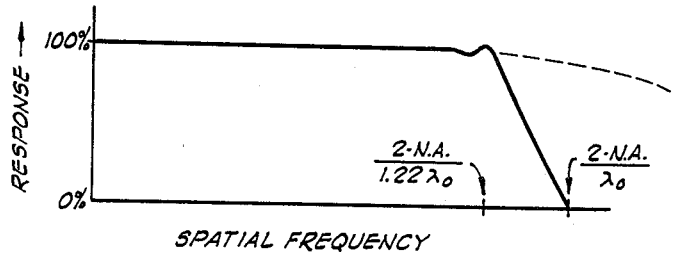

Assuming the data has a good signal to noise ratio, the high spatial frequences may be boosted, as shown in FIG. 2D. In FIG. 2D, the dotted response assumes nonlinear harmonic estimation for the sole purpose of filtering image fringes. This is advisable because the normal Fraunhofer diffraction transforming an impulse into an Airy disk produces fringing that is substantially accentuated to form distracting effects approaching a two-dimensional sinc function, such as that obtained with point source lighting, and similar to but more severe than "Mackie lines" in some early photographs. One of several criterion for generating nonlinear estimation of frequencies beyond the diffraction limit is presented. Let:

REAL = real world image we attempt to recover,
HAVE = image we have recorded = REAL + blurring and/or noise,
TEST = a reconstructed image which is to be tested for quality,
P(TEST) = probability TEST can be a real world image,
P(TEST|HAVE) = probability TEST is the real world image given HAVE, and
P(HAVE|TEST) = probability blurring and/or noise would transform TEST into HAVE.

We wish to find a TEST such that

P(TEST|HAVE)

is maximized, i.e. find a TEST with the highest probability of representing REAL. An alternative integrates each TEST times its probability. Using Bayes' theorem the above becomes:

$$P(TEST|HAVE) = \frac{P(HAVE|TEST) \cdot P(TEST)}{P(HAVE)} \propto P(HAVE|TEST) \cdot P(TEST)$$

which, given a set of assumptions of the real world, blurring, and noise characteristics, can be directly calculated for any given TEST reconstruction. Finding a TEST that maximizes this function in the presence of noise has been the subject of research by others in the field. Linear frequency reconstruction maximizes the Bayes' formula for the false assumption that the real world image is gaussian, like "snow" on an empty television channel. This false assumption permits distracting fringe effects that an observer, with a priori knowledge of the real world, knows are not present at all specimen boundaries. The system can then be given "knowledge" that a true image is composed of edges with step size probability distribution function logarithmically distributed. Unlike other fringe-suppressing algorithms proposed in the literature, the Bayes' approach would have no effect on known spatial frequencies in the absence of noise, rather would only estimate those beyond the diffraction limit. This could not claim to extend the diffraction limit, however it would make spatial frequencies near the limit more visually useful, and produce images with optimum RMS correlation to the true image. The dotted response in FIG. 2D is not included in subsequent calculations.

Various methods of quantifying image clarity based on M.T.F. (modulation transfer functions such as in FIGS. 2A–D) agree that in the absence of noise, and with magnification sufficient to avoid visual limitations, the area under the transfer function is a good specification of image clarity. Comparing FIGS. 2B and 2D, the clarity improvement with micro-optical tomography is found as:

$$\frac{\text{Area of 2D}}{\text{Area of 2B}} = \text{effects from } (N.A. \cdot \text{Depth} \cdot \text{Enhancement}) = \quad (2)$$

$$\frac{1.25}{.65} \cdot \sqrt{2} \cdot \frac{.85}{.45} = 5.13$$

Thus for a typical subject we expect a five-fold increase in image clarity over present art microscopy. For comparison, imagine a 3 inch mask over a 15 inch TV to represent present technology, and the entire TV image to represent the image that is possible.

It is interesting to note that the Rayleigh resolution limit is $$\frac{1.22 \cdot \lambda_o}{2 \cdot N.A.} \quad (3)$$

even though the ultimate limit is a spatial wavelength of $$\frac{\lambda_o}{2 \cdot N.A.} \quad (4)$$

allowing independent sampling points as close as $$\frac{\lambda_o}{4 \cdot N.A.}. \quad (5)$$

With a maximum amplitude boost of ten fold at a spatial frequency of $F_{cutoff}/1.22$, two dots at the Rayleigh separation can be observed completely separate with no overlap of "bridge" between the dots. Also of interest, it has been shown that for a small bounded object, such as a chromosome in a neutral field, it is theoretically possible to reconstruct detail arbitrarily far beyond the classical diffraction limit, at the expense of extreme demands on original image fidelity.

A stereo microscope using micro-optical tomography is easily formed in software by taking advantage of the transparency effect mentioned above. Two separate image matrices are allocated. As reconstruction scans from back to front, the position of each new image plane is biased linearly to the left for one matrix and to the right for the other. The transparency effect and overwrite procedure presented above would form two separate views of the specimen at apparently different angles. Conventional stereo microscopy uses two objectives or one objective optically divided into two. Diffraction is thus at the very least doubled. Requiring reasonable stereo difference angles and depth of field limits present-art stereo microscopy to very low resolutions compared to the capability of light itself. Conversely, the stereo micro-optical tomographic algorithm outlined above can use a maximum, full objective field for each image, for a dramatic advance in the state of the art.

Figure 3:
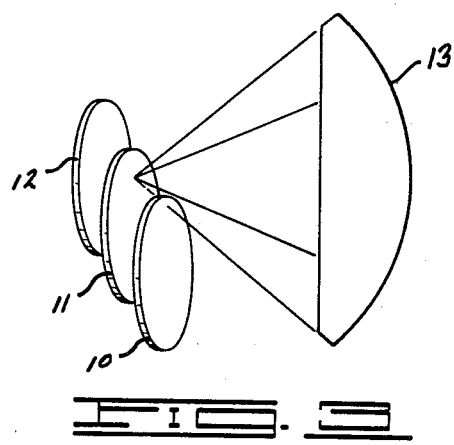
FIG. 3 illustrates a high numerical aperture lens as dynamically focused to generate a series of related plane images.
Figure 4:
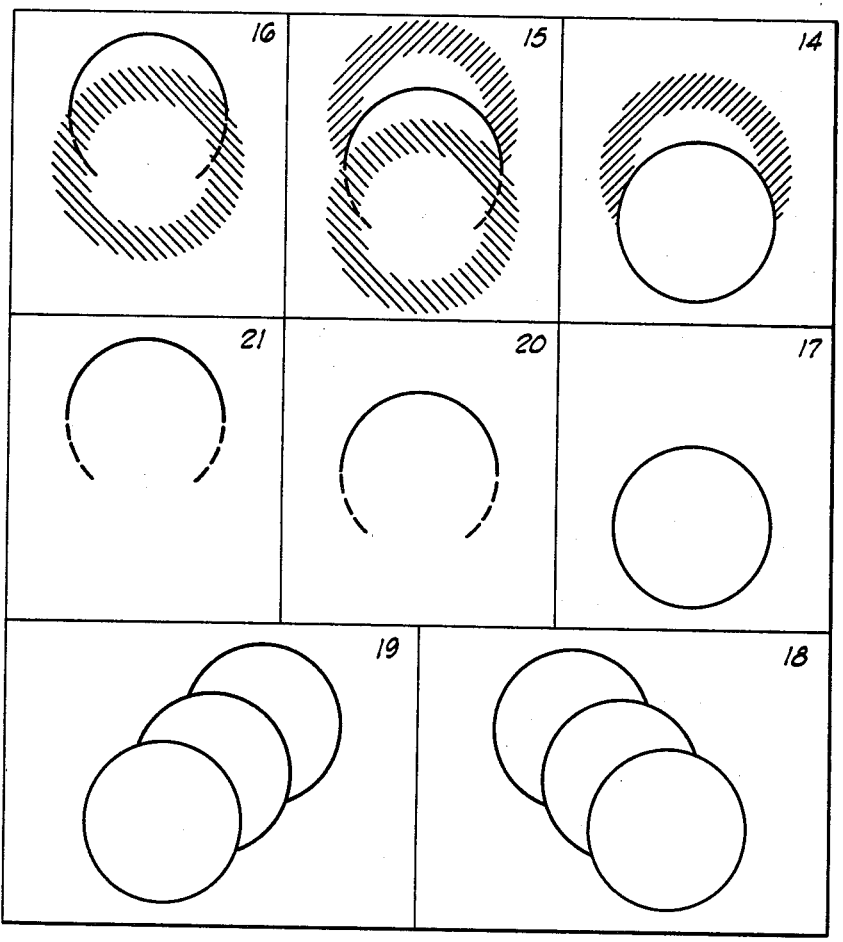
FIG. 4 illustrates in idealized form the manner in which selected related plane images are recombined front to back with offset to form a stereo pair.

Referring now to FIGS. 3 and 4 as an example of micro-optical tomography applied to stereo microscopy, we wish to image a specimen consisting of several image planes 10-12. In this example only three image planes are used to simplify discussion. As the focus of lens 13 is scanned, images 14-16 are formed. In image 14, specimen plane 10 appears in focus, with plane 11 in back being out of focus but non-overlapping. Because of the focus-sensing algorithm, the image of plane 11 is suppressed to form dissected image 17, which is copied to output images 18 and 19, leaving the backgrounds of 18 and 19 blank, or undefined, meaning that no object has as yet been found in those positions. Next in image 15 specimen plane 11 is in focus. The non-overlapping image of plane 12 is extracted as before, however, the blurred image of plane 10 overlaps with that of plane 11. The image of plane 10 is extracted from image 15 by linearly subtracting the dissected image 17 after blurring by an amount corresponding to the focus difference between the planes. Dissected image plane 20 results, which is then added to output images 18 and 19, modifying only those pixels which have not already been written from image 17. Image 20 is offset to the right before underlaying image 19, and to the left before underlaying image 18. Image size, brightness, etc., as well as lateral movement, may also be modified to enchance dimensionality. Finally, in image 16, image plane 12 is in focus. The overlapping effects of image planes 10 and 11 are subtracted using blurred images from 17 and 20 to form dissected image 21, which is then offset and underlapped as before to images 18 and 19. The background remains undefined, as no object has been identified there in any of the three planes, and could be set black. Images 18 and 19 are stereoscopic pairs and may be viewed to display greatly enhanced information. A monocular image can be formed in like manner by forming only image 18.

The basic method of micro-optical tomography as depicted in FIG. 1 may be carried out by a great variety of magnification and sensing means so long as the capability is retained to derive an image array of the specimen at each of plural image planes or angles for subsequent compositing to provide the final image array having enhanced information and detail. A most basic form, the method could be performed manually with compositing of a final image array from a sensor such as photographic film or the retina of the human eye. However, more modern sensing techniques coupled with data processing advances enable a much more efficient micro-optical tomographic system yielding improved results.

Figure 5:
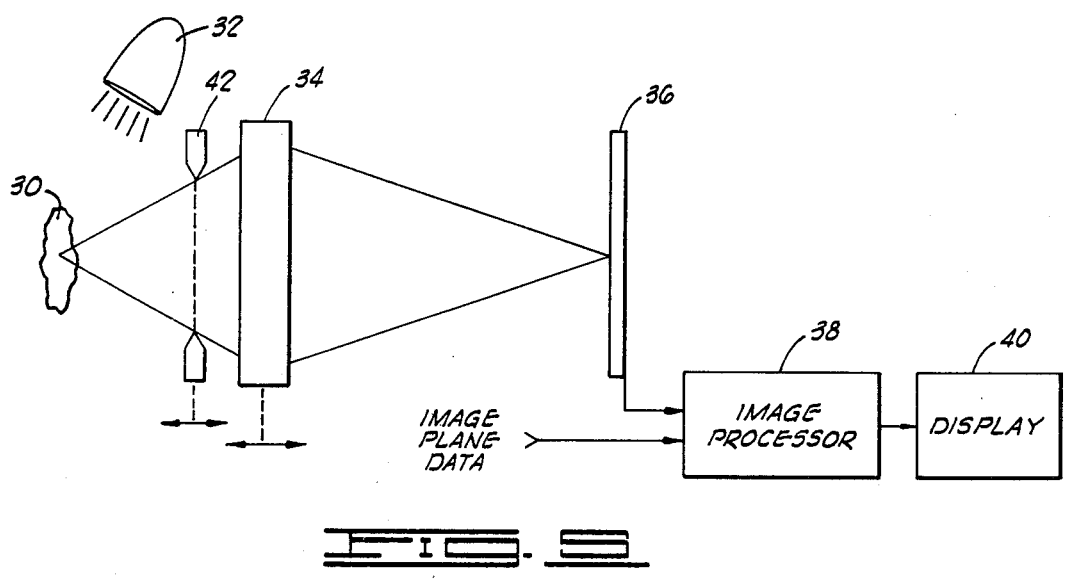
FIG. 5 is a block diagram of a basic form of micro-optical processing apparatus.

FIG. 5 illustrates a basic form of structure wherein a specimen 30 as illuminated by lamp 32 is viewed through an objective 34 focusing at an image plane occupied by a suitable sensor 36. The sensor 36 may be such as a vidicon face for reading out the image data under suitable synchronous beam scanning for input to an image processor 38. The processed composite image from image processor 38 may then be output to a suitable display 40 such as a video display, storage scope, film output or the like. Adjustable stops 42 provide an aperture adjustment for use in coaction with objective 34 in the imaging process.

A variation of the parameters of optical magnification may be effected in any of several ways, e.g. incremental adjustment of objective 34, incremental adjustment of aperture stops 42, either as to shape or position, or by incremental movement of the elements of the objective 34 to change the viewing angle. Whatever the selected mode for incremental optical adjustment, a multiple of two-dimensional image arrays having related visual content are presented at the image plane on sensor 36.

The image processor 38 has been constructed as a special purpose digital computer capable of processing the multiple image arrays for composite output at display 40; however, programs presently exist for use in general purpose computers to carry out needed image compositing functions.

Figure 6:
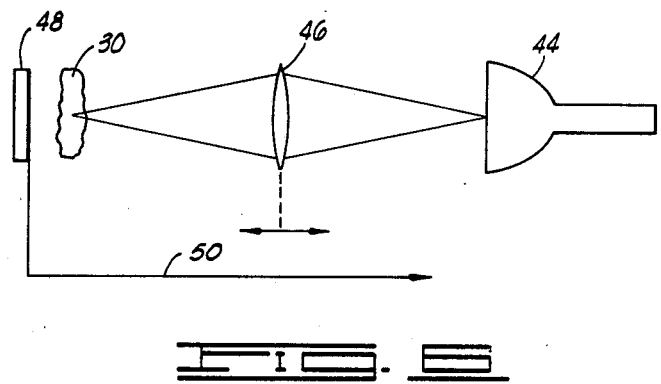
FIG. 6 illustrates a micro-optical tomography apparatus using a flying spot scanner.

FIG. 6 illustrates an alternative structure wherein the imaging means and the illuminating means are reciprocal, i.e. a flying spot scanner. Thus, a suitably synchronized flying spot scanner 44 generates the desired scanning raster for magnification by adjustable objective 46 as the flying spot is focused on specimen 30 with subsequent pick up of the visual point data by a suitable photosensor 48. The photosensor 48 may be a photomultiplier or other form of image intensifer as output is provided via lead 50 to the image processor or image compositing computer. Adjustment of the image plane to define the selected image arrays may be carried out by varying any of the several parameters of the associated optics as was described relative to FIG. 5, i.e. variation of the focus, variation of the shape or position of an aperture in the optics, or alteration of the viewing angle.

Figure 7:
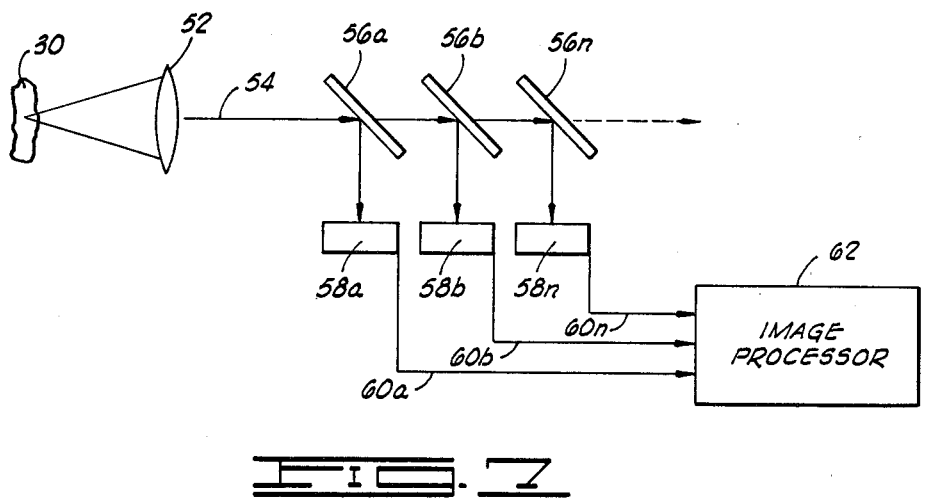
FIG. 7 depicts yet another form of apparatus that may be utilized in performing micro-optical tomography.

FIG. 7 illustrates still a further structure wherein the several image arrays representing different settings of a varied parameter are obtained simultaneously by means of multiple image means in different positions. The specimen 30 as scanned by an objective 52 is projected as an image along perpendicular line 54 and through each of a plurality of semi-anodized or two-way mirrors 56a-56n. Depending upon the spacing and number of mirrors 56a-56n a multiple of separate image arrays are projected onto respective photosensors 58a, 58b through 58n, and output may be taken on respective lines 60a, 60b through 60n for input to the properly programmed image processor 62.

The embodiments referred to herein are only illustrations of selected forms of structure for carrying out the method of micro-optical tomography as presented herein, and such references are not intended to be given as a limitation. It will be understood by those skilled in the art that many variations are possible without departing from the spirit and scope of the present invention.

What is claimed is:

1. Apparatus for viewing a selected specimen to construct a micro-optical tomograph, comprising:
   (a) optical means to form an image of the specimen so that a first level of the specimen is in focus and a second level of the specimen located behind said first level is not in focus;

(b) means to suppress said not-in-focus second level to form a dissected in-focus first two-dimensional image array;

(c) means to hold an output image;

(d) means to transfer said dissected in-focus first two-dimensional image array to said output image;

(e) means to vary the focus of said optical means so said first level is not in focus and said second level is in focus;

(f) means utilizing said dissected in-focus first two dimensional image array to extract said not-in-focus first level from the optical imaging of step (e) to form a dissected in-focus second two-dimensional image array; and (g) means to transfer said dissected in-focus second two-dimensional image array to said output image to form a composite image array.

2. A method of micro-optical tomography for viewing a selected illuminated specimen, comprising:

(a) optically imaging the specimen so that a first two-dimensional image array of the specimen is in focus and a second two-dimensional image array of the specimen is not in focus, said second two-dimensional image array being in the background of said first two-dimensional image array;

(b) suppressing said not-in-focus second two-dimensional image array to form a dissected in-focus first two-dimensional image array;

(c) copying said dissected in-focus first two-dimensional image array to an output image;

(d) optically imaging the specimen so that said first two-dimensional image array is not in focus and said second two-dimensional image array is in focus;

(e) utilizing said dissected in-focus first two-dimensional image array to extract said not-in-focus first two-dimensional image array from the optical imaging of step (d) to form a dissected in-focus second two-dimensional image array; and (f) copying said dissected in-focus second two-dimensional image array to said output image to form a composite image array.

3. A method as set forth in claim 2 wherein dissected in-focus first two-dimensional image array is composited over dissected in-focus second two-dimensional image array on the output image.

4. A method as set forth in claim 2 wherein two output images are formed with the dissected in-focus two-dimensional image arrays copied to each output image offset in lateral opposing directions to form a stereoscopic pair.

5. A method of micro-optical tomography for viewing a selected illuminated specimen comprising:

(a) optically imaging the specimen so that a first two-dimensional image array of the specimen is in focus and a second two-dimensional image array of the specimen is not in focus, said second two-dimensional image array being in the background of said first two-dimensional image array;

(b) suppressing said not-in-focus second two-dimensional image array to form a dissected in-focus first two-dimensional image array;

(c) optically imaging the specimen so that said first two-dimensional image array is not in focus and said second two-dimensional image array is in focus; and (d) utilizing said dissected in-focus first two-dimensional image array to extract said not-in-focus first two-dimensional image array from the optical imaging of step (c) to form a dissected in-focus second two-dimensional image array.

* * * * *